United States Patent
Nabozny et al.

(10) Patent No.: US 8,865,608 B2
(45) Date of Patent: Oct. 21, 2014

(54) TURNDOWN THERMOCOMPRESSOR DESIGN FOR CONTINUOUS CATALYST RECOVERY

(75) Inventors: Brian Nabozny, Des Plaines, IL (US); William D. Schlueter, Des Plaines, IL (US); Kate Tuson, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 1241 days.

(21) Appl. No.: 12/394,108

(22) Filed: Feb. 27, 2009

(65) Prior Publication Data

US 2010/0222202 A1 Sep. 2, 2010

(51) Int. Cl.
*B01J 38/04* (2006.01)
*B01J 38/42* (2006.01)
*B01J 23/96* (2006.01)
*B01J 38/22* (2006.01)
*B01J 38/44* (2006.01)

(52) U.S. Cl.
CPC *B01J 38/42* (2013.01); *B01J 23/96* (2013.01); *B01J 38/22* (2013.01); *B01J 38/44* (2013.01); *B01J 38/04* (2013.01)
USPC .......... 502/34; 502/35; 502/38; 502/56; 422/295; 208/134; 208/139; 208/140

(58) Field of Classification Search
CPC ............ B01J 20/34; B01J 23/96; B01J 38/04; B01J 38/44; B01J 38/22; B01J 38/12; B01J 38/02; B01J 19/004; C10G 35/10; C01B 17/0452; C01B 17/0413; C01B 17/04; C01B 17/00
See application file for complete search history.

(56) References Cited

U.S. PATENT DOCUMENTS

| | | | |
|---|---|---|---|
| 4,605,427 A | 8/1986 | Erickson | |
| 5,295,350 A | 3/1994 | Child et al. | |
| 5,824,619 A * | 10/1998 | Sechrist et al. | 502/34 |
| 5,979,183 A | 11/1999 | Smith et al. | |
| 6,141,950 A | 11/2000 | Smith et al. | |
| 6,345,493 B1 | 2/2002 | Smith et al. | |
| 6,508,998 B1 * | 1/2003 | Nasato | 423/573.1 |
| 8,071,497 B2 * | 12/2011 | Yuan et al. | 502/35 |
| 2003/0101736 A1 | 6/2003 | Cheng et al. | |

FOREIGN PATENT DOCUMENTS

WO 2008/082406 A1 7/2008

OTHER PUBLICATIONS

T. Herron et al., "Performance of a Reciprocating Expander-Compressor for a Miniature Heat-Actuated Heat Pump," Collection of Technical Papers—3rd International Energy Conversion Engineering Conference, 2005, vol. 3, pp. 1656-1663 (abstract only).

(Continued)

*Primary Examiner* — Melvin C Mayes
*Assistant Examiner* — Smita Patel
(74) *Attorney, Agent, or Firm* — Maryann Maas

(57) ABSTRACT

Systems and processes for regenerating catalyst are provided herein that include a catalyst regeneration tower having a cooling zone that receives a catalyst cooling stream generated by a cooling gas loop. The systems and processes include a first thermocompressor that utilizes a first motive vapor and a second thermocompressor that utilizes a second motive vapor in order to provide the catalyst cooling stream to the regeneration tower. The second thermocompressor operates in parallel with the first thermocompressor. The first thermocompressor can utilize combustion air as the motive vapor. The second thermocompressor can utilize nitrogen as the motive vapor.

10 Claims, 1 Drawing Sheet

(56) References Cited

OTHER PUBLICATIONS

I. Templalexis et al., "Quasi-Three-Dimensional Compressor Performance Simulation Using Streamline Curvature and Multi-Parallel Compressor Theory," Proceedings of the ASME Turbo Expo, American Society of Mechanical Engineers, 2006, vol. 4, pp. 297-309 (abstract only).

* cited by examiner

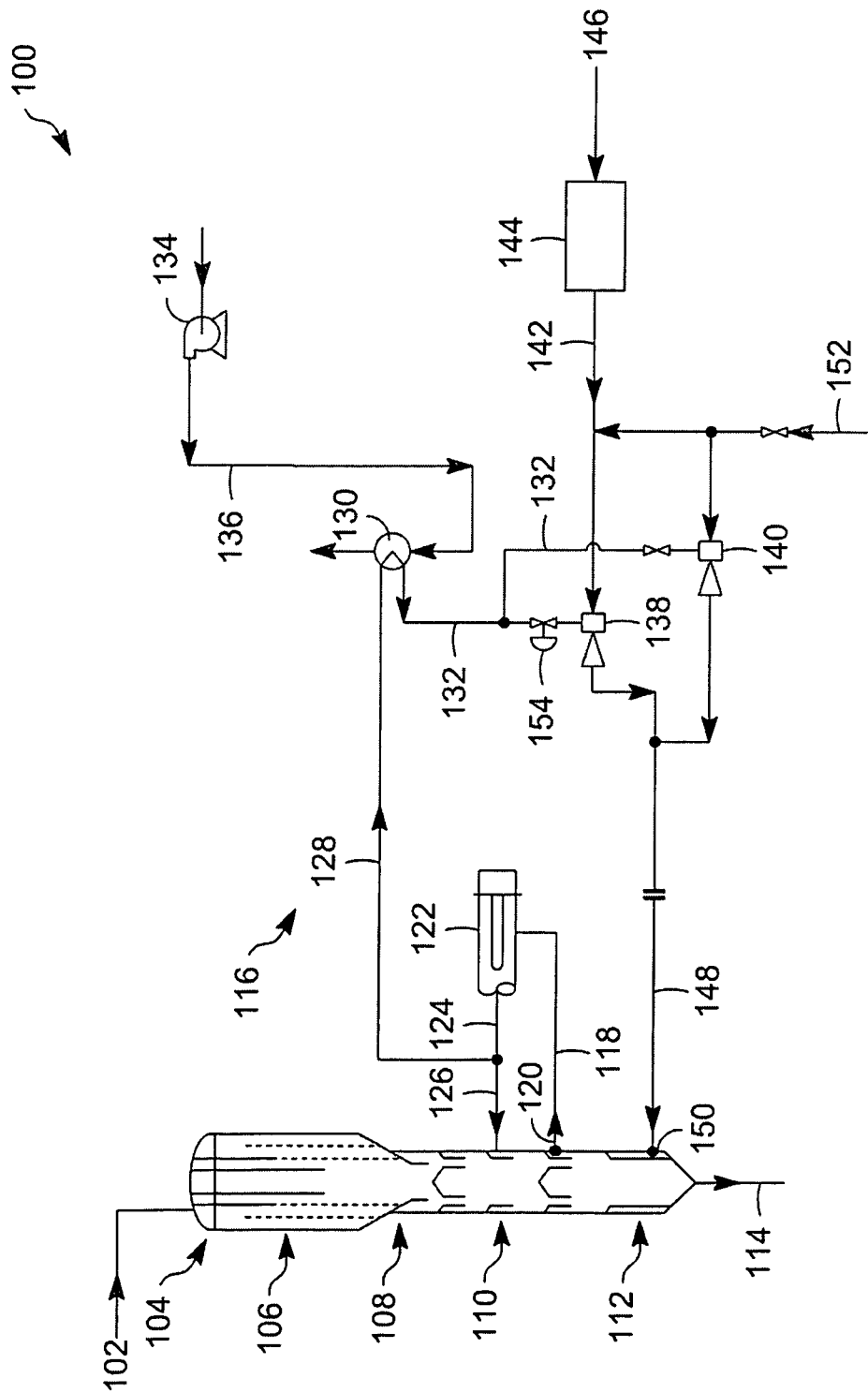

TURNDOWN THERMOCOMPRESSOR DESIGN FOR CONTINUOUS CATALYST RECOVERY

FIELD OF THE INVENTION

The systems and processes disclosed herein relate to the regeneration of spent catalyst in the art of catalytic conversion of hydrocarbons to useful hydrocarbon products, and more particularly to thermocompressors utilized in a continuous catalyst regeneration (CCR) process.

DESCRIPTION OF RELATED ART

The catalysts used in catalytic processes for the conversion of hydrocarbons tend to become deactivated for one or more reasons. In instances where the accumulation of coke deposits causes the deactivation, regenerating of the catalyst to remove coke deposits can restore the activity of the catalyst. Coke is normally removed from catalyst by contact of the coke-containing catalyst at high temperature with an oxygen-containing gas to combust and remove the coke in a regeneration process. These processes can be carried out in-situ, or the catalyst may be removed from a reactor in which the hydrocarbon conversion takes place and transported to a separate regeneration zone for coke removal. Various arrangements for continuously or semicontinuously removing catalyst particles from a reaction zone and for coke removal in a regeneration zone have been developed.

Some continuous catalyst regeneration systems provide a thermocompressor to facilitate continued operation of the continuous catalyst regeneration processes during brief periods of operation under low coke conditions. One system utilizing a thermocompressor is described, for example, in PCT Application No. PCT/US2006/062647, the content of which is hereby incorporated by reference in its entirety. A thermocompressor can circulate air from the outlet of the air heater to mix with combustion air going to the cooling zone and provide a net amount of combustion air to the cooling zone. The thermocompressor can utilize combustion air as the motive air, and difficulties in maintaining operation of the system can occur because the net quantity of combustion air in low coke conditions may be insufficient to satisfy the minimum flow requirement for the air heater and/or for cooling the catalyst.

SUMMARY OF THE INVENTION

The systems and processes disclosed herein relate to continuous catalyst regeneration, particularly to such systems and processes that utilize a plurality of thermocompressors to facilitate continuous catalyst regeneration under low coke conditions.

In one aspect, a catalyst regeneration system system is provided that includes a catalyst regeneration tower, a first thermocompressor, a second thermocompressor in parallel with the first thermocompressor, and one or more valves. The catalyst regeneration tower includes a cooling zone that receives a catalyst cooling stream. The first thermocompressor utilizes a first motive vapor. The second thermocompressor utilizes nitrogen as a motive vapor. The one or more valves can selectively direct a cooled stream to at least one of the first thermocompressor or the second thermocompressor to produce the catalyst cooling stream.

In a second aspect, a process for providing a catalyst cooling stream to a catalyst regeneration tower is provided that includes selectively providing a cooled stream to at least one of a first thermocompressor or a second thermocompressor, to produce a catalyst cooling stream. and The first thermocompressor utilizes a first motive vapor. The second thermocompressor utilizes a second motive vapor. The catalyst cooling stream can be provided to a catalyst cooling zone in a catalyst regeneration tower.

In a third aspect, a process for regenerating catalyst is provided that includes removing a first gas stream from a regeneration tower, passing the first gas stream to an air heater to form a heated first gas stream, dividing the heated first gas stream to form a regeneration tower return stream and a cooling loop stream, cooling the cooling loop stream in a cooling zone cooler to form a cooled stream, selectively providing the cooled stream to at least one of a first thermocompressor or a second thermocompressor to produce a catalyst cooling stream, and providing the catalyst cooling stream to the regeneration tower. The first thermocompressor utilizes a first motive vapor. The second thermocompressor utilizes a second motive vapor.

BRIEF DESCRIPTION OF THE DRAWINGS

Specific examples have been chosen for purposes of illustration and description, and are shown in the accompanying drawings, forming a part of the specification.

FIG. 1 is a simplified flow diagram of a portion of a continuous catalyst regeneration process that includes a cooling gas loop.

DETAILED DESCRIPTION

FIG. 1 is a simplified flow diagram of a continuous catalyst regeneration (CCR) system indicated generally at 100. As illustrated, spent catalyst 102 can be removed from a reactor and provided to a catalyst regeneration tower 104. The catalyst regeneration tower 104 can have a plurality of regeneration zones or stages through which the spent catalyst passes when undergoing regeneration. As illustrated, regeneration tower 104 includes a combustion zone 106, a halogenation zone 108, a drying zone 110, and a cooling zone 112. Spent catalyst can enter the regeneration tower 104 through an inlet at the top of the regeneration tower 104. Upon entering the regeneration tower 104, the spent catalyst can undergo the regeneration process by entering combustion zone 106, and then subsequently proceeding through the halogenation zone 108, the drying zone 110, and the cooling zone 112. Regenerated catalyst 114 can be removed from the catalyst regeneration tower 104, and can be returned to the reactor.

As illustrated in FIG. 1, the continuous catalyst regeneration process 100 has a cooling gas loop 116. Cooling gas loop 116 includes a first gas stream 118 that is removed from a cooling zone outlet 120 in the cooling zone 112 of the regeneration tower 104. First gas stream 118 can contain air, and can have a temperature of from about 300° F. (149° C.) to about 1000° F. (538° C.). First gas stream 118 can be passed through a conduit to an air heater 122. Air heater 122 heats the first gas stream 118, for example to a temperature of about 1050° F. (566° C.), to form a heated first gas stream 124. The heated first gas stream 124 exits the air heater 122, and can be divided into at least two gas streams, including a regeneration tower return stream 126 and a cooling loop stream 128. The regeneration tower return stream 126 can be passed through a conduit back to the regeneration tower 104, and can be provided to the drying zone 110. After it enters the drying zone, the gas in the regeneration tower return stream 126 can rise within the regeneration tower 104, and can be utilized in the combustion zone 106.

The cooling loop stream 128 can be passed through a conduit to a cooling zone cooler 130. Cooling zone cooler 130 can be a heat exchanger, and is preferably an indirect heat exchanger such as, for example, a double pipe heat exchanger, or a shell and tube type heat exchanger. When the cooling zone cooler 130 is a shell and tube exchanger, the cooling loop stream 128 can be passed through the tube side of the cooling zone cooler 130 to form cooled stream 132.

The cooling zone cooler 130 can be cooled with any suitable medium, such as air or water. For example, as illustrated in FIG. 1, a cooler blower 134 can receive atmospheric air, or ambient air from the outdoors, and can provide an atmospheric air stream 136 to the cooling zone cooler 130 to act as a cooling fluid for cooling loop stream 128. When cooling zone cooler is a shell and tube type heat exchanger, for example, atmospheric air stream 136 can be provided to the shell side of the cooling zone cooler 130.

As shown in FIG. 1, cooling gas loop 116 can include one or more thermocompressors, such as a first thermocompressor 138 and a second thermocompressor 140. Generally, the thermocompressors 138 and 140 can utilize the kinetic energy of a primary fluid, such as the first and second motive vapors described below, to pump a secondary fluid, such as cooled stream 132. The first thermocompressor can utilize a first motive vapor, and the second thermocompressor can utilize a second motive vapor. The second motive vapor can preferably have a composition that is different from the composition of the first motive vapor. For example, as illustrated in FIG. 1, first thermocompressor 138 can utilize combustion air as the first motive vapor, and second thermocompressor 140 can utilize nitrogen as the second motive vapor.

First thermocompressor 138 and second thermocompressor 140 are preferably configured to operate in parallel. The cooled stream 132 can be selectively directed, and can be provided to at least one of the first thermocompressor or the second thermocompressor to produce a catalyst cooling stream 148. The cooled stream 132 can form at least part of the catalyst cooling stream 148. Catalyst cooling stream 148 can also include the motive vapor of any thermocompressor to which the cooled stream 132 is provided. Catalyst cooling stream 148 can thus include the first motive vapor, the second motive vapor, or both the first and second motive vapors. Catalyst cooling stream 148 can be passed through a conduit to an inlet 150 of the regeneration tower 104, and can be provided to the cooling zone 112 of the catalyst regeneration tower 104.

The cooled stream 132 can be provided to the first thermocompressor 138, to the second thermocompressor 140, or can be divided and provided to both the first thermocompressor 138 and the second thermocompressor 140. One or more valves, such as illustrated valve 154, can be utilized to selectively direct the cooled stream 132. The one or more valves can be operated by one or more switches, such as, for example, a software switch. The cooled stream 132 can be selectively directed based upon operating conditions, including, but not limited to, catalyst coke level, instrument header pressure, and other operating conditions.

In some instances, it may be desirable to operate the first thermocompressor 138 during a first set of operating conditions, and to operate the second thermocompressor 140 during a second set of operating conditions. For example, the cooling gas loop 116 can utilize first thermocompressor 138 under normal operating conditions, or for short term operations under low coke conditions, and can utilize second thermocompressor 140 for operation during periods of continuous low coke conditions.

With respect to the utilization of the first thermocompressor 138, the first motive vapor 142 can be supplied to the first thermocompressor 138 through dryer 144. As shown in FIG. 1, dryer 144 can receive a gas stream 146, and can supply motive vapor 142 through a conduit to the first thermocompressor 138. The gas stream 146 can be air, and can include oxygen and nitrogen. The flow rate or amount of the first motive vapor 142 can be controlled based upon the amount of oxygen required by the combustion zone 106. The flow rate for the first motive vapor 142 can be based on a reduced combustion air rate, such as, for example, about 25% of the design combustion air, and a reduced instrument air header pressure, such as, for example, a pressure that is about 10 psi lower than the pressure available under normal operating conditions.

To facilitate the operation of the first thermocompressor 138 under certain conditions, such as, for example, longer term low coke or very low coke operation conditions, a nitrogen stream 152 can be provided and combined with the first motive vapor 142 to add motive flow for the first thermocompressor 138. The nitrogen stream 152 can provide added motive gas flow and gas pressure to help satisfy the process requirements, the nitrogen results in reduced oxygen concentration in the chlorination zone of the regeneration tower. Over extended periods of time, however, the lower oxygen concentration in the chlorination zone of the regeneration tower may adversely impact the quality of the catalyst regeneration.

With respect to utilization of the second thermocompressor 140, nitrogen stream 152 can be received by the second thermocompressor 140, and can act as the second motive vapor for the second thermocompressor 140. Nitrogen stream 152 can consist substantially completely of nitrogen. The nitrogen stream 152 can be provided to the second thermocompressor 140 at a higher pressure than the combustion air utilized as the motive vapor for first thermocompressor 138. The second thermocompressor 140 can thus operate at a higher ratio of load gas to motive gas than the first thermocompressor 138. The higher ratio can provide additional load gas flow to maintain long term low coke operation while maintaining an appropriate oxygen concentration in the halogenation zone 108 of the regeneration tower 104. In some examples, the pressure of nitrogen stream 152 can be from about 30 psi to about 300 psi higher than the pressure of the combustion air utilized as the motive vapor for the first thermocompressor 138. The flow rate of nitrogen stream 152 can preferably be controlled to maintain the oxygen content in the halogenation zone 108 at a level of above about 10%, and preferably at a level of above about 18%.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. A process for regenerating catalyst, the process comprising:
 removing a first gas stream from a regeneration tower;
 passing the first gas stream to an air heater to form a heated first gas stream;
 dividing the heated first gas stream to form a regeneration tower return stream and a cooling loop stream;

cooling the cooling loop stream in a cooling zone cooler to form a cooled stream;
providing a first thermocompressor and a second thermocompressor;
selectively providing the cooled stream to the first thermocompressor that utilizes a first motive vapor for a period of time and the second thermocompressor that utilizes nitrogen as a second motive vapor for another period of time, to produce a catalyst cooling stream wherein the nitrogen is provided to the second thermocompressor at a higher pressure than the first motive vapor is provided to the first thermocompressor; and
providing the catalyst cooling stream to the regeneration tower.

2. The process of claim 1, wherein the pressure of the nitrogen is about 30 psi to about 300 psi higher than the pressure of the first motive vapor.

3. The process of claim 1, wherein the second thermocompressor operates at a higher ratio of load gas to motive gas than the first thermocompressor.

4. The process of claim 1, wherein the nitrogen has a flow rate that is controlled to maintain the oxygen content in a halogenation zone at a level of above about 18%.

5. The process of claim 1, wherein the selectivity providing the cooled stream to the first thermocompressor and the second thermocompressor is based on operating conditions.

6. The process of claim 5, wherein the selectivity providing the cooled stream to the first thermocompressor and the second thermocompressor is based on the catalyst coke level.

7. A process for regenerating catalyst, the process comprising:
removing a first gas stream from a regeneration tower;
passing the first gas stream to an air heater to form a heated first gas stream;
dividing the heated first gas stream to form a regeneration tower return stream and a cooling loop stream;
cooling the cooling loop stream in a cooling zone cooler to form a cooled stream;
providing a first thermocompressor and a second thermocompressor;
providing, for a period of time, the cooled stream to both the first thermocompressor that utilizes a first motive vapor and the second thermocompressor that utilizes nitrogen as a second motive vapor, to produce a catalyst cooling stream wherein the nitrogen is provided to the second thermocompressor at a higher pressure than the first motive vapor is provided to the first thermocompressor; and
providing the catalyst cooling stream to the regeneration tower.

8. The process of claim 7, wherein the pressure of the nitrogen is about 30 psi to about 300 psi higher than the pressure of the first motive vapor.

9. The process of claim 7, wherein the second thermocompressor operates at a higher ratio of load gas to motive gas than the first thermocompressor.

10. The process of claim 7, wherein the nitrogen has a flow rate that is controlled to maintain the oxygen content in a halogenation zone at a level of above about 18%.

* * * * *